United States Patent [19]
Croy

[11] Patent Number: 5,380,125
[45] Date of Patent: Jan. 10, 1995

[54] FLUID EXTRACTION DEVICE

[76] Inventor: Richard L. Croy, 3201 Masters Dr., Clearwater, Fla. 34621

[21] Appl. No.: 26,536

[22] Filed: May 14, 1993

[51] Int. Cl.6 .............................................. B09B 3/00
[52] U.S. Cl. .................. 405/128; 166/267; 405/52
[58] Field of Search ............... 405/128, 129, 258, 52, 405/303; 166/265, 267

[56] References Cited

U.S. PATENT DOCUMENTS

| | | | |
|---|---|---|---|
| 5,154,538 | 10/1992 | Bockle | 405/128 |
| 5,160,217 | 11/1992 | Metzer et al. | 405/128 |
| 5,246,309 | 9/1993 | Hobby | 405/128 |
| 5,249,888 | 10/1993 | Braithwaite et al. | 405/128 |

*Primary Examiner*—David H. Corbin
*Attorney, Agent, or Firm*—Arthur W. Fisher, III

[57] ABSTRACT

A fluid extraction device to remove fluid contaminants from the vadose zone of unsaturated subsurface area by selectively evacuating liquid and gas therefrom comprising a lower well screen assembly coupled to a vacuum source through an upper fluid conduit structure including a fluid flow control to separately extract liquid and vapor from the vadose zone and a fluid flow indicator to separately monitor the flow of liquid and vapor through the upper fluid conduit structure.

11 Claims, 3 Drawing Sheets

FLUID EXTRACTION DEVICE

BACKGROUND OF THE INVENTION

1. Field of the Invention

A fluid extraction device to remove fluid contaminants from the vadose zone of unsaturated subsurface area by selectively evacuating liquid and gas therefrom.

2. Description of the Prior Art

Numerous devices and methods have been developed to remove volatile contaminants from the vadose zone; that is the area between the earth's surface and the underground water table.

Contamination of the subsurface ground results from spills, leakage from storage facilities or surface discharges. These contaminants eventually percolate into the groundwater to create a health hazard.

Circulation systems for leaching the contaminants from contaminated media above the water table have been developed such as shown in U.S. Pat. No. 4,167,973. Contaminant vapors may be extracted from contaminated underground areas by means of a plurality of elongated perforated collection elements as taught in U.S. Pat. No. 4,183,407. However, such a system is limited to removal of contaminants from relatively shallow.

U.S. Pat. No. 4,369,839 shows a casing vacuum system which applies a controlled vacuum to the space within the casing of an oil well in order to maintain the gas pressure in the well within a certain range to improve the recovery of petroleum from the well. A water accumulator protects the vacuum pump from water damage. A condensate accumulator collects the gas drawn from the well and condenses a portion into liquid hydrocarbons. A mercury vacuum switch maintains the gas pressure in the well within the optimum range for recovery of petroleum.

U.S. Pat. No. 4,544,037 discloses the production of methane from an underground wet coal seam initiated by drilling a well from the surface of the earth through the seam. High pressure gas is injected into the seam to drive water away from the wellbore. Initial gas production is followed by a mixture of return injected gas and methane, free methane from the fracture system of the coal and finally methane from the coal.

U.S. Pat. No. 2,910,002 relates to a dual-zone pumping apparatus of the sucker rod type for simultaneously producing oil and gas from two formations or zones within a single well bore without commingling the oil and gas from either formation.

U.S. Pat. No. 4,823,880 teaches a valve to facilitate the removal of water from gas wells having two or more gas productive zones disposed vertically along their bore. The valve is adapted to form a connection between a segregation packer and a well tubing string. In use, the valve and the segregation packer are sunk in the well to a position intermediate an upper gas productive zone and a lower gas productive zone. During normal gas production, the valve is closed and gas is collected from both zones, the gas from the lower zone passing through a vertical passage defined by the valve and continuous with the interior of the well tubing. Incidental water accumulated above the segregation packer can be removed by opening the valve and using the gas pressure of the lower productive zone to force the accumulated water upwards to the wellhead and out of the well. Once the well bore has been purged of incidental water, the valve is reclosed and normal production resumes.

U.S. Pat. No. 4,593,760 is an additional example of the prior art.

SUMMARY OF THE INVENTION

The present invention relates to a fluid extraction device to remove fluid contaminants from the vadose zone of unsaturated subsurface area by selectively evacuating liquid and gas therefrom comprising a lower well screen assembly coupled to a vacuum source through an upper fluid conduit structure including a fluid flow control to separately extract liquid and vapor from the vadose zone and a fluid flow indicator to separately monitor the flow of liquid and vapor through the upper fluid conduit structure.

The lower well screen assembly comprises a housing or screen including an upper gas or vapor extraction section and a lower liquid extraction section each having a plurality of vertically disposed elongated evacuation apertures formed therethrough.

A gas/vapor extraction tube disposed within the housing or screen is coupled to the upper fluid conduit structure. A gas/vapor extraction depth control means comprising an inflatable member movably disposed within the upper gas or vapor extraction section is coupled to an air source to seal and isolate the interior of the housing or screen above the gas/vapor extraction control means.

A liquid extraction tube disposed within the housing or screen is also coupled to the upper fluid conduit structure. A liquid extraction depth control means comprising a buoyance means movably coupled to the lower portion of the liquid extraction tube within the lower liquid extraction section to selectively control the depth of the liquid extraction depth control means relative to the water table to control the evacuation or withdrawal of oil and other contaminants through the liquid extraction tube.

The upper fluid conduit structure comprises a fluid conduit means, fluid flow control means, fluid quality test means and fluid flow indicator means to control and monitor the flow of liquid and vapor from the lower well screen assembly.

Once installed, the gas/vapor extraction depth control means may be adjusted vertically within the housing or screen and inflated through an air supply conduit permitting gas/vapors to be extracted from the ground adjacent the vertical disposed elongated evacuation apertures through the upper fluid conduit structure to a disposal device. The liquid extraction depth control means floats at the interface between the water level and oil, diesel, other contaminants. When suction or vacuum is applied to the liquid extraction conduit, contaminants will be drawn therethrough and through the upper fluid conduit structure to a disposal device.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

BRIEF DESCRIPTION OF THE DRAWINGS

For a fuller understanding of the nature and object of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

Figure 1:
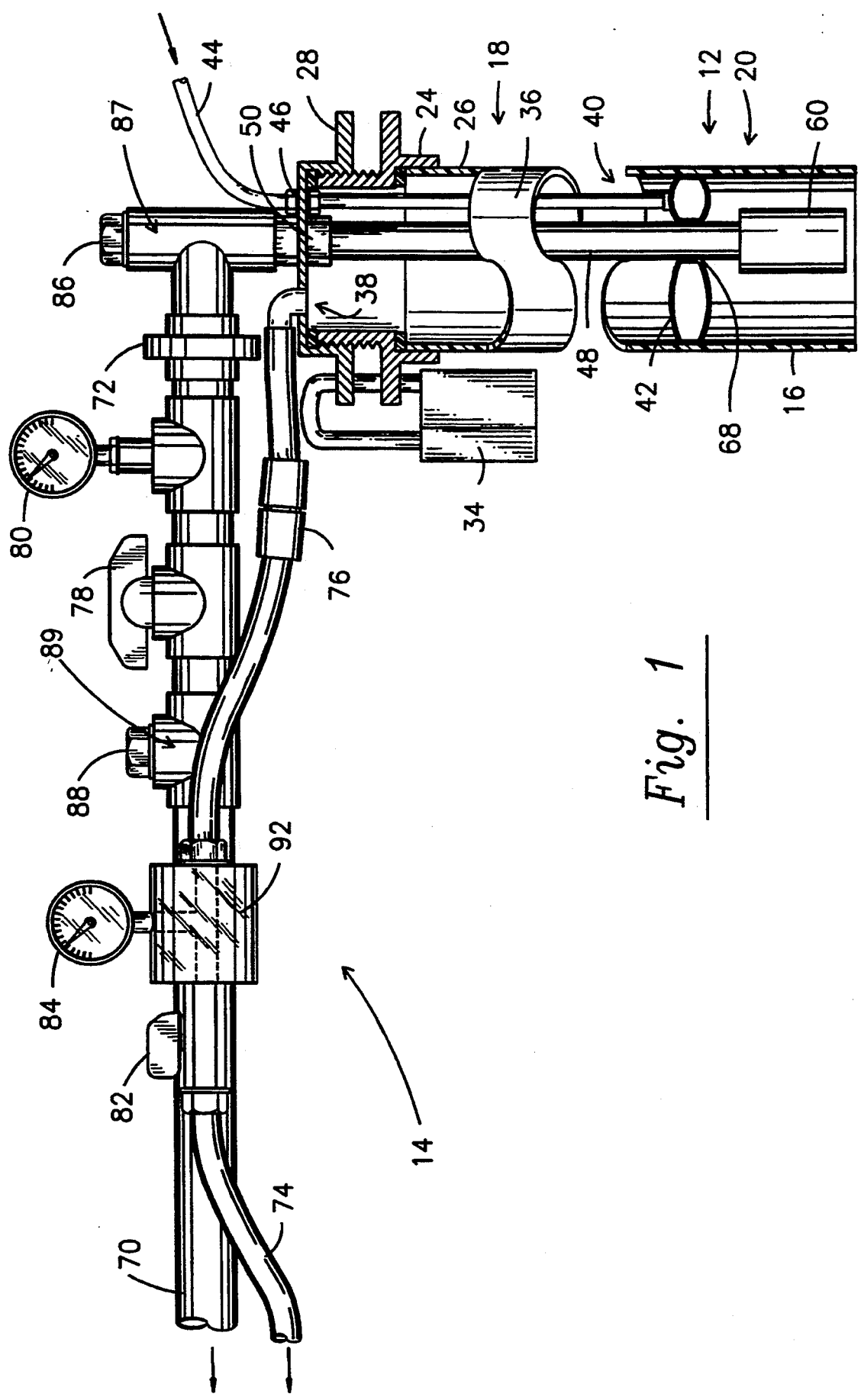
FIG. 1 is a partial cross-sectional side view of the fluid extraction device.
Figure 2:
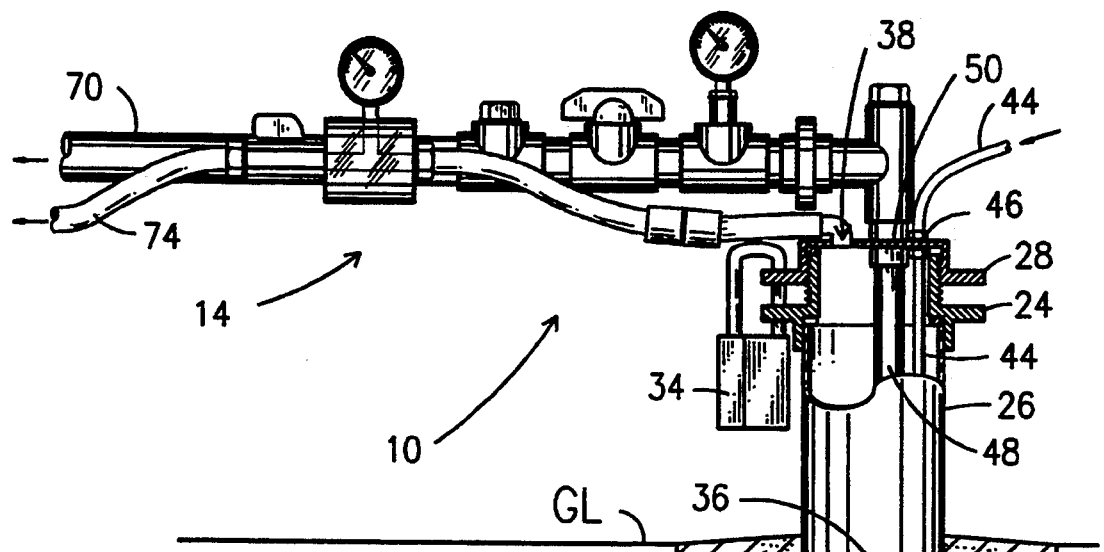
FIG. 2 is a side view of the fluid extraction device installed.
Figure 2:
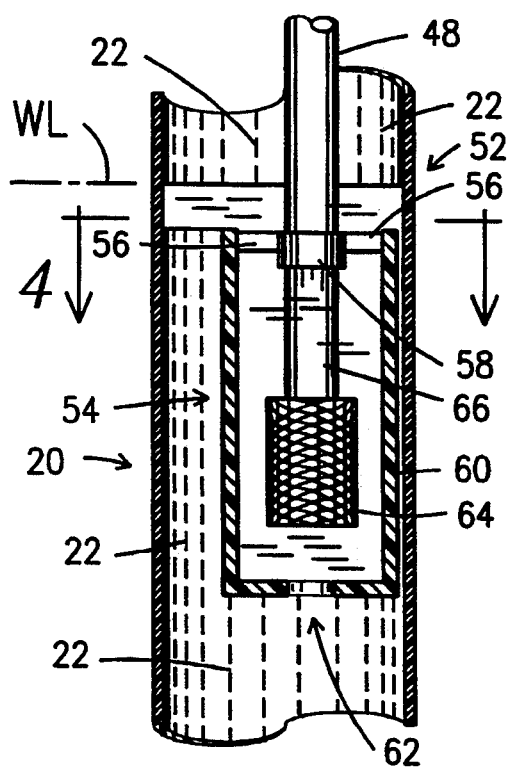
Figure 5:
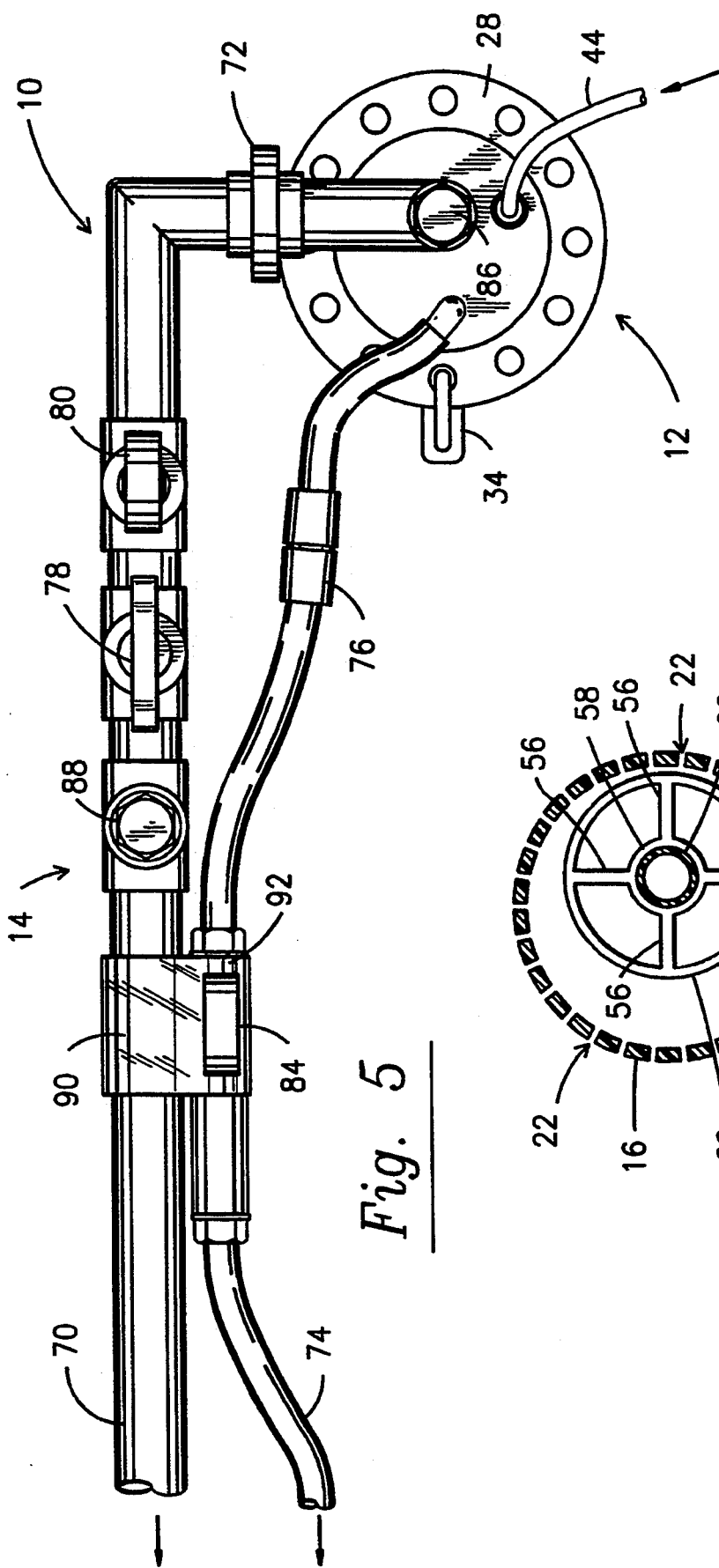
FIG. 5 is a top view of the fluid extraction device.

As best shown in FIGS. 1, 2 and 5, the present invention relates to a fluid extraction device generally indicated as 10 to remove fluid contaminants from the vadose zone of unsaturated subsurface area by selectively evacuating liquid and gas therefrom comprising a lower well screen assembly generally indicated as 12 coupled to a vacuum source (not shown) through an upper fluid conduit structure generally indicated as 14 including a fluid flow control to separately extract liquid and vapor from the vadose zone and a fluid flow indicator to separately monitor the flow of liquid and vapor through the upper fluid conduit structure 14.

As best shown in FIGS. 1 and 2, the lower well screen assembly 12 comprises an elongated hollow extraction housing or screen 16 including an upper gas or vapor extraction section 18 and a lower liquid extraction section 20 each having a plurality of vertically disposed elongated evacuation apertures each indicated as 22 formed therethrough. A closure cap including a lower cap element 24 is affixed to the upper portion 26 of the elongated hollow extraction housing or screen 16 with an upper cap element 28 removably attached thereto; while a pointed member 30 is affixed to the lower portion 32 of the elongated hollow extraction housing or screen 16 are disposed on opposite end thereof. A pad lock 34 or the like may be used to secure or lock the lower cap element 24 and upper cap element 28 together.

A gas/vapor extraction tube 36 disposed within the interior of the elongated hollow extraction housing or screen 16 is coupled to the upper fluid conduit structure 14 through a gas outlet port 38 formed through the upper cap element 28. A gas/vapor extraction depth control means generally indicated as 40 comprising an inflatable member 42 movably disposed within the interior of the upper gas or vapor extraction section 18 is coupled to an air source (not shown) by an air supply tube 44 through an air inlet port 46 formed through the upper cap element 28 to seal and isolate the interior of the elongated hollow extraction housing or screen 16 above the gas/vapor extraction control means 40.

Figure 3:
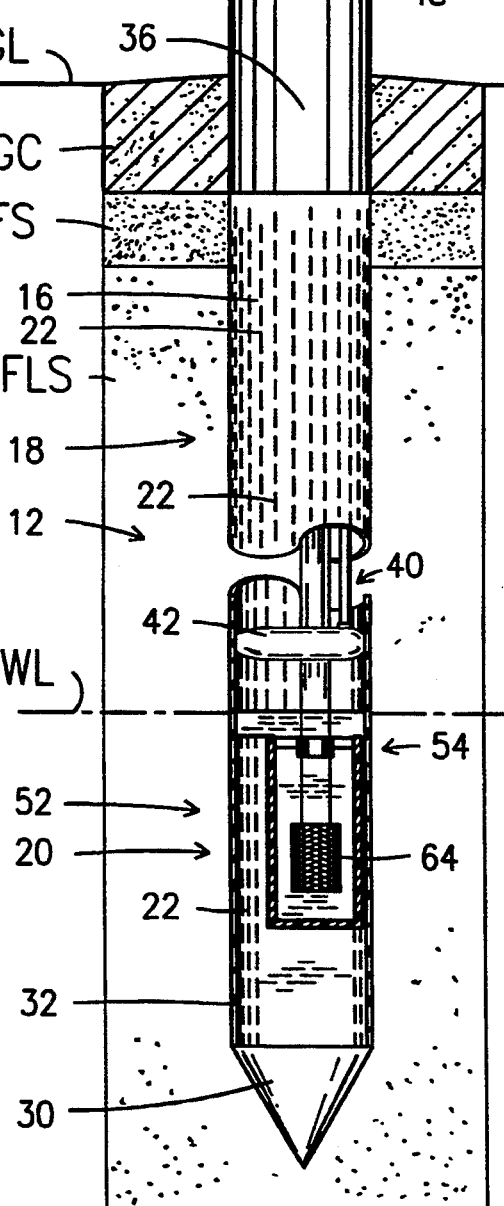
FIG. 3 is a detailed cross-sectional side view of the liquid extraction depth control means.
Figure 4:
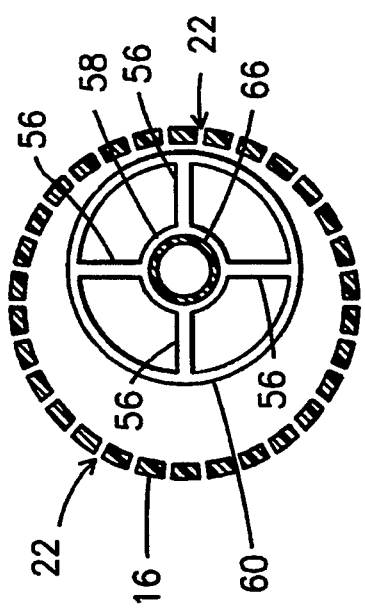
FIG. 4 is a cross-sectional top view of the liquid extraction depth control means taken along line 4—4 of FIG. 3.

A liquid extraction tube 48 disposed within the interior of the elongated hollow extraction housing or screen 16 is coupled to the upper fluid conduit structure 14 through a liquid output port 50 formed through the upper cap element 28. A as best shown in FIGS. 3 and 4, a liquid extraction depth control means generally indicated as 52 comprising a buoyance means 54 movably coupled to the lower portion of the liquid extraction tube 48 by a plurality of radial arms each indicated as 56 and a collar 58 within the interior of the lower liquid extraction section 20 to selectively control the depth of the liquid extraction depth control means 52 relative to the water table to control the evacuation or withdrawal of oil and other contaminants through the liquid extraction tube 48. The buoyance means 54 comprises a hollow float 60 having an aperture 62 formed in the lower portion thereof disposed in surrounding relationship relative to a filter or stop 64 attached to the lower end portion of a liquid extraction tube extension 66 telescopingly coupled to the lower portion of the liquid extraction tube 48. The liquid extraction tube 48 passed through an aperture 68 formed through the inflatable member 42.

As best shown in FIGS. 1, 2 and 5, the upper fluid conduit structure 14 comprises a fluid conduit means, fluid flow control means, fluid quality test means and fluid flow indicator means.

The fluid conduit means comprises a liquid conduit 70 connected to the liquid extraction tube 48 by a first coupler 72 and a gas/vapor conduit 74 connected to the gas/vapor extraction tube 36 by a second coupler 76. Both the liquid conduit 70 and gas/vapor conduit 74 are coupled to a conventional pump means such as an exhaust fan, blower or vacuum pump (not shown) to selectively create a suction or vacuum through the gas/vapor extraction tube 36 and liquid extraction tube 48 to draw gas/vapor and liquid through the vertically disposed elongated evacuation aperture 22 into the elongated hollow extraction housing or screen 16.

The fluid flow control means comprises a liquid flow control means 78 and a liquid vacuum gauge 80, and a gas/vapor flow control means 82 and gas/vapor vacuum gauge 84 disposed in operative relationship relative to the liquid conduit 70 and gas/vapor conduit 74 respectively to control the flow of extracted liquid and gas/vapor respectively therethrough. The liquid flow control means 78 comprises a two position valve movable between a first and second position to prevent flow of liquid through the liquid conduit 70 when in the first position and prevent flow of liquid through the liquid conduit 70 when in the second position. The gas/vapor flow control means 82 comprises a two position valve movable between a first and second position to prevent flow of liquid through the gas/vapor conduit 74 when in the first position and prevent flow of gas/vapor through the gas/vapor conduit 74 when in the second position.

The fluid quality test means comprises a liquid test cap 86 removably connected to the liquid extraction tube 48 through liquid port 87 and a gas/vapor test cap 88 connected to the gas/vapor extraction tube 36 by a gas port 89. The fluid flow indicator means comprises a liquid flow indicator or window 90 formed in liquid conduit 70 and a gas/vapor flow indicator or window 92 formed in the gas/vapor conduit 74. In addition, the liquid test cap 86 may be removed to permit direct access to water table for sampling.

As shown in FIG. 2, the fluid extraction device is operatively disposed within the ground. The site installation may include a grout cap (GC) immediately below ground level (GL), a layer of fine sand (FS) and a layer of filter sand (FLS).

Once installed, the gas/vapor extraction depth control means 40 may be adjusted vertically within the elongated hollow extraction housing or screen 16 and inflated through the air supply conduit 44 permitting gas/vapors to be extracted from the ground adjacent the vertical disposed elongated evacuation apertures 22 when the gas/vapor flow control means 82 is in the first or open position. Of course, with the gas/vapor control means 82 is in the second position, no gas or vapor will flow through the gas/vapor conduit 74. The buoyancy of the liquid extraction depth control means 52 is such that the upper end of the float 60 will be disposed at the interface between the water level (WL) and oil, diesel, other contaminants. Thus, when suction or vacuum is applied to the liquid conduit 70 and the liquid flow control means 78 is in the first or open position, contaminants will be drawn through the filter 60, liquid extraction tube 48 and liquid conduit 70.

Alternately the liquid extraction tube 48 may be coupled to a positive pressure source (not shown) then liquid conduit 70 to supply air to the ground surrounding the lower portion of the elongated hollow extraction housing or screen 16 to feed organisms or air strip.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,
What is claimed:

1. A fluid extraction device to remove fluid contaminants from the vadose zone of unsaturated subsurface area by selectively evacuating liquid and gas therefrom comprising a lower well screen assembly coupled to a vacuum source through an upper fluid conduit structure including a fluid flow control to separately extract liquid and vapor from the vadose zone, said lower well screen assembly comprises an elongated hollow extraction housing including an upper vapor extraction section and a lower liquid extraction section each having a plurality of vertically disposed elongated evacuation apertures formed therethrough, a vapor extraction tube is disposed within the interior of said elongated hollow extraction housing coupled to said upper fluid conduit structure, a vapor extraction depth control means comprising an inflatable member is movably disposed within the interior of said upper vapor extraction section coupled to an air source by an air supply tube, a liquid extraction tube disposed within the interior of said elongated hollow extraction housing is coupled to said upper fluid conduit structure, and a liquid extraction depth control comprising a buoyance means movably coupled to the lower portion of said liquid extraction tube by a plurality of radial arms and a collar within the interior of said lower liquid extraction section to selectively control the depth of said liquid extraction depth control means relative to the water table to control the evacuation or withdrawal of oil and other contaminants through said liquid extraction tube.

2. The fluid extraction device of claim 1 further including a fluid flow indicator to separately monitor the flow of liquid and vapor through said upper fluid conduit structure.

3. The fluid extraction device of claim 1 wherein said buoyance means comprises a hollow float having an aperture formed in the lower portion thereof disposed in surrounding relationship relative to a filter attached to the lower end portion of a liquid extraction tube extension telescopingly coupled to the lower portion of said liquid extraction tube.

4. The fluid extraction device of claim 3 wherein said liquid extraction tube is passed through an aperture formed through an inflatable member.

5. The fluid extraction device of claim 1 wherein said upper fluid conduit structure comprises a fluid conduit means, fluid flow control means, fluid quality test means and fluid flow indicator means.

6. The fluid extraction device of claim 5 wherein said fluid conduit means comprises a liquid conduit connected to said liquid extraction tube by a first coupler and a vapor conduit connected to said vapor extraction tube by a second coupler, said liquid conduit and said vapor conduit being coupled to a conventional pump means to selectively create a suction through said vapor extraction tube and said liquid extraction tube to draw vapor and liquid through said vertically disposed elongated evacuation aperture into said elongated hollow extraction housing.

7. The fluid extraction device of claim 5 wherein said fluid control means comprises a liquid flow control means and a liquid vacuum gauge, and a vapor flow control means and a vapor vacuum gauge disposed in operative relationship relative to said liquid conduit and said vapor conduit respectively to control the flow of extracted liquid and vapor respectively therethrough.

8. The fluid extraction device of claim 7 wherein said liquid flow control means also comprising a two position valve movable between a first and second position to prevent flow of liquid through said liquid conduit when in a first position and prevent flow of liquid through said liquid conduit when in a second position.

9. The fluid extraction device of claim 8 wherein said vapor flow control means comprising a two position valve movable between a first and second position to prevent flow of liquid through said vapor conduit when in said first position and prevent flow of vapor through said vapor conduit when in said second position.

10. The fluid extraction device of claim 5 wherein said fluid quality test means comprises a liquid test cap removably connected to said liquid extraction tube through a liquid port and a vapor test cap connected to said vapor extraction tube by a vapor port.

11. The fluid extraction device of claim 10 wherein said fluid flow indicator means comprising a liquid flow indicator or window formed in said liquid conduit and said vapor flow indicator or window formed in said vapor conduit.

* * * * *